United States Patent
Morroni

(10) Patent No.: US 9,871,456 B2
(45) Date of Patent: Jan. 16, 2018

(54) VOLTAGE CONVERSION DEVICE AND METHOD OF OPERATION

(71) Applicant: Texas Instruments Incorporated, Dallas, TX (US)

(72) Inventor: Jeffrey Anthony Morroni, Highlands Ranch, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/791,322

(22) Filed: Jul. 3, 2015

(65) Prior Publication Data

US 2017/0005580 A1    Jan. 5, 2017

(51) Int. Cl.
 *H02M 3/335* (2006.01)
 *H02M 3/337* (2006.01)
 *H02M 3/156* (2006.01)

(52) U.S. Cl.
 CPC ....... *H02M 3/33569* (2013.01); *H02M 3/337* (2013.01); *H02M 3/33592* (2013.01); *H02M 2003/1566* (2013.01); *Y02B 70/1475* (2013.01)

(58) Field of Classification Search
 CPC . H02M 2001/0019; H02M 2003/1566; H02M 3/335; H02M 3/33538; H02M 3/33546; H02M 3/33569; H02M 3/33576; H02M 3/33592
 See application file for complete search history.

(56) References Cited

U.S. PATENT DOCUMENTS

| | | | | |
|---|---|---|---|---|
| 2004/0257056 | A1* | 12/2004 | Huang | H02M 3/1588 323/282 |
| 2009/0086512 | A1* | 4/2009 | Fahlenkamp | H02M 3/33592 363/21.06 |
| 2009/0174262 | A1* | 7/2009 | Martin | H02M 3/157 307/82 |
| 2011/0194206 | A1* | 8/2011 | Sase | H02M 3/33592 360/75 |
| 2012/0212193 | A1* | 8/2012 | Sreenivas | H02M 3/1588 323/234 |
| 2013/0033902 | A1* | 2/2013 | Zhang | H02M 3/33523 363/15 |
| 2013/0038310 | A1* | 2/2013 | Menegoli | H02M 3/156 323/288 |

(Continued)

OTHER PUBLICATIONS

Laplante, P.A. (ed.). Comprehensive Dictionary of Electrical Engineering, Second Edition, entries for "Duty Cycle" and "Pulse Width Modulation". CRC Press: Boca Raton, FL, 2005, pp. 216, 553-554.*

*Primary Examiner* — Fred E Finch, III
(74) *Attorney, Agent, or Firm* — Michael A. Davis, Jr.; Charles A. Brill; Frank D. Cimino

(57) ABSTRACT

A voltage conversion device includes a transformer and at least one transistor. The transformer has a primary side and a secondary side, the secondary side being couplable to a load. The output voltage of the voltage conversion device is coupled across the load. The at least one transistor is coupled to the primary side of the transformer and regulates the output voltage of the voltage conversion device. The output voltage is partially a function of the duty cycle of the at least one transistor. The switching frequency of the at least one transistor is decreased in response to a transient increase in load current.

16 Claims, 5 Drawing Sheets

(56) References Cited

U.S. PATENT DOCUMENTS

| | | | |
|---|---|---|---|
| 2015/0109824 A1* | 4/2015 | Chen | H02M 3/22 363/17 |
| 2015/0109830 A1* | 4/2015 | Xu | H02M 3/33569 363/21.03 |
| 2015/0236600 A1* | 8/2015 | Waffler | H02M 3/33515 378/119 |

* cited by examiner

VOLTAGE CONVERSION DEVICE AND METHOD OF OPERATION

BACKGROUND

Electronic devices are generally supplied with power from a power supply unit that converts AC line voltage to a fixed DC voltage. However, various components in such electronic devices may require a different voltage than is supplied by the power supply. Also, some of these components require a highly regulated voltage to operate properly. DC-to-DC converters convert the output of the power supply unit to a different, regulated voltage. For example, a DC-to-DC converter may be required to produce a 5-volt regulated output. In another example, a DC-to-DC converter may need to be capable of providing multiple different voltage levels to multiple different loads. For example, a DC-to-DC converter might need to be capable of providing a 0.8-volt regulated output, a 3.3-volt regulated output, and a 12-volt regulated output.

DC-to-DC converters may be used by a wide variety of electronic devices, such as computers, network cards, and DSL (digital subscriber line) cards. In a computer, the power supply unit may produce one voltage for supply to components (such as disk drives), while another lower voltage is required for the memory chips or processor. It is important in such applications that this lower voltage level be maintained as precisely as possible, because the logic circuitry depends upon voltage levels for accuracy. This is true even when current demands are being placed on the main power supply, such as during start-up when the disk drives are operating and drawing more power than usual.

An isolated power converter is a power converter in which the input referred ground is physically disconnected from the output referred ground. Isolated DC-to-DC power converters include a transformer that provides a barrier between the input-side voltage and output-side voltage. This transformer provides a measure of safety, because the barrier can withstand high input voltages. In some isolated converters, transient response, typically to load steps, is limited by the leakage inductance of the transformer itself. This is especially an issue with hard-switched full-bridge and phase-shifted full-bridge converters. As a consequence of the limited transient response performance, these types of converters have not yet been applied to very dynamic loads, such as CPUs.

SUMMARY

In described examples, a voltage conversion device includes a transformer and at least one transistor. The transformer has a primary side and a secondary side, the secondary side being couplable to a load. The output voltage of the voltage conversion device is coupled across the load. The at least one transistor is coupled to the primary side of the transformer and regulates the output voltage of the voltage conversion device. The output voltage is partially a function of the duty cycle of the at least one transistor. The switching frequency of the at least one transistor is decreased in response to a transient increase in load current.

DETAILED DESCRIPTION

This disclosure relates generally to devices, systems and methods for improving transient response in an isolated voltage converter.

Figure 1:
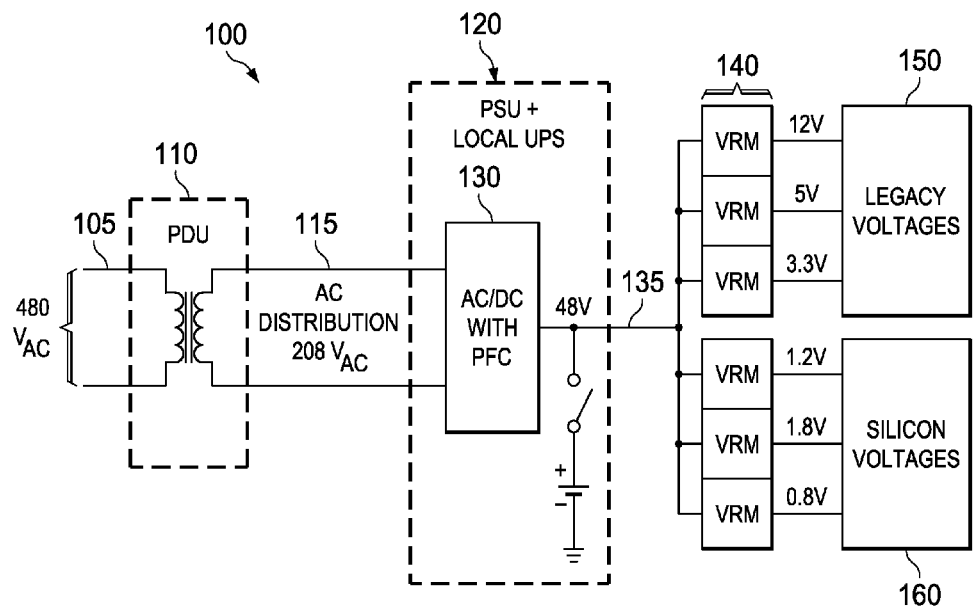
FIG. 1 is a block diagram of an electrical power conversion system of example embodiments.

FIG. 1 is a block diagram of an electrical power conversion system 100 of example embodiments. Other power conversion system configurations are possible. In the electrical power conversion system 100 of FIG. 1, power distribution unit (PDU) 110 receives alternating current (AC) electrical power via power lines 105 and steps the voltage down to a lower voltage, providing the lower voltage to AC distribution lines 115. In the example of FIG. 1, the PDU receives 480 volts from lines 105 and steps it down to 208 volts. Power supply unit (PSU) 120 includes an AC/DC conversion unit 130 that converts the power received via AC distribution lines 115 to a direct current voltage (48 volts in the example of FIG. 1) and provides the DC voltage to power cable 135. In the example of FIG. 1, the PSU 120 also includes a local uninterruptible power supply that provides emergency power if the main power fails. The power cable 135 provides the voltage produced by the PSU 120 (48 volts in the example of FIG. 1) to an isolated power converter 140, which converts the 48 volts to multiple different voltage levels. In the example of FIG. 1, the isolated voltage converter 140 produces six different voltage levels, which are 12 volts, 5 volts and 3.3 volts for powering various legacy devices 150, and 1.2 volts, 1.8 volts and 0.8 volts for powering various semiconductor devices 160. For each voltage level produced by the isolated voltage converter 140, the isolated voltage converter has a unique voltage regulator module (VRM). Thus, the isolated voltage converter 140 of FIG. 1 has six different VRM modules.

Figure 2:
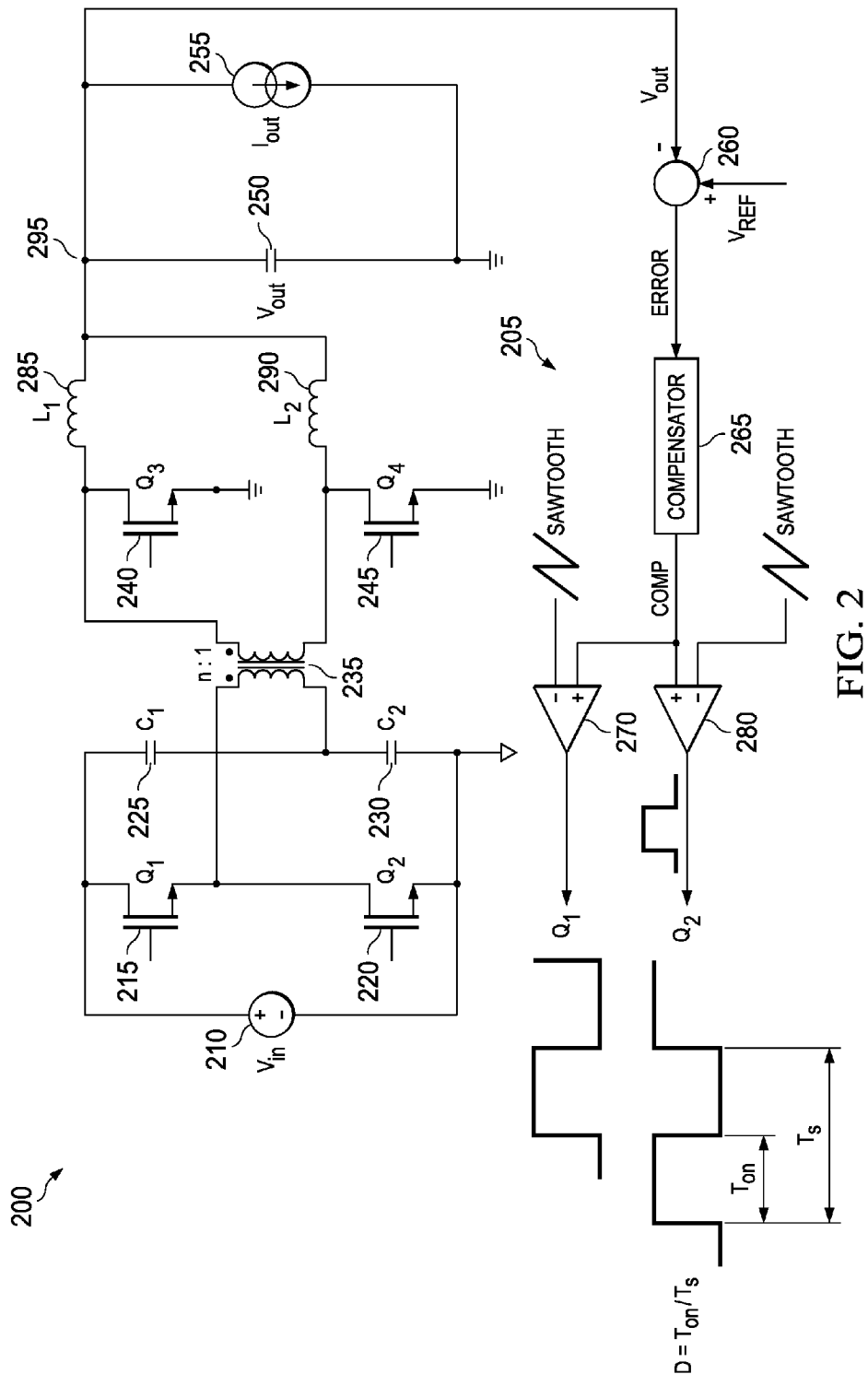
FIG. 2 is an example circuit diagram of an isolated voltage converter and associated control circuitry.

FIG. 2 is an example circuit diagram of an isolated voltage converter 200 and associated control circuitry 205. In a first example, the isolated voltage converter 200 and the control loop 205 represent a stand-alone voltage converter. In a second example, the isolated voltage converter 200 and the control loop 205 represent one of multiple voltage regulator modules in a voltage converter, such as the voltage converter 140 of FIG. 1. The isolated voltage converter 200 of FIG. 2 uses a current doubler secondary side configuration. The described examples are applicable to many different voltage converter topologies and control loop implementations, such as current mode voltage converters, hysteric constant on-time voltage converters, and constant off-time converters.

The voltage converter 200 receives an input voltage $V_{in}$ 210. The voltage converter 200 employs a transformer 235 having a primary side and a secondary side. The primary side is coupled to two transistors, $Q_1$ 215 and $Q_2$ 220, which are connected in series across the input voltage $V_{in}$ 210. The input voltage $V_{in}$ is coupled across the drain of transistor $Q_1$ 215 and the source of $Q_2$ 220. The source of $Q_1$ 215 is coupled to the drain of $Q_2$ 220, and this node is coupled to a first end of the transformer 235. In the example of FIG. 2, the transistors $Q_1$ 215 and $Q_2$ 220 are N-channel metal-oxide-semiconductor field-effect transistors (MOSFETs), but other types of transistors could also be used, such as P-channel MOSFETs, other types of field-effect transistors, such as junction gate field-effect transistors (JFETs), or bipolar junction transistors (BJTs). The input voltage $V_{in}$ 210 is also coupled across two capacitors, $C_1$ 225 and $C_2$ 230, which are connected in series. The junction of $C_1$ 225 and $C_2$ 230 is coupled to the second end of the primary side of the transformer 235.

The secondary side of the transformer 235 is coupled to a current doubler circuit, which includes two transistors $Q_3$ 240 and $Q_4$ 245 and two inductors $L_1$ 285 and $L_2$ 290. As shown in FIG. 2, a first end of the secondary side of the transformer 235 is coupled to the drain of transistor $Q_3$ 240, and the second end of the secondary side of the transformer is coupled to the drain of $Q_4$ 245. The sources of transistors $Q_3$ 235 and $Q_4$ 240 are both coupled to ground. The first end of the secondary side of the transformer 235 is coupled to a first end of inductor $L_1$ 285, and the second end of the secondary side of the transformer is coupled to inductor $L_2$ 290. The second end of the inductors $L_1$ 285 and $L_2$ 290 are coupled together at a node 295, which constitutes the output of the voltage converter 200. The output voltage $V_{out}$ is coupled to a load 255, and to an output capacitor 250 coupled in parallel with the load 255. The sum of the current $I_{L1}$ through inductor $L_1$ 285 and the current $I_{L2}$ through inductor $L_2$ 290 is equal to the current $I_{out}$ drawn by the load 255, so $I_{out}=I_{L1}+I_{L2}$.

The control loop 205 receives the output voltage $V_{out}$ and compares it to a reference voltage $V_{ref}$ that represents a target output voltage, as represented by the subtraction element 260 in FIG. 2. The difference between $V_{out}$ and $V_{ref}$, also referred to herein as the error or $V_{error}$, is provided to a compensator module 265, which generates a compensation signal in response to the difference. The compensation signal is provided to the non-inverting inputs of differential amplifiers 270 and 280. The inverting input of differential amplifier 270 receives a first sawtooth signal, and the inverting input of differential amplifier 280 receives a second sawtooth signal. The output of differential amplifier 270 is a substantially square wave that drives the gate of transistor $Q_1$ 215, and the output of differential amplifier 280 is a substantially square wave that drives the gate of transistor $Q_2$ 220. Transistor $Q_1$ 215 is: (a) turned on when the output of differential amplifier 270 is high; and (b) turned off when the output of differential amplifier 270 is low. Similarly, transistor $Q_2$ 220 is: (a) turned on when the output of differential amplifier 280 is high; and (b) turned off when the output of differential amplifier 270 is low. The $Q_1$ and $Q_2$ gate driver waveforms are phase shifted by 180 degrees.

The control loop 205 regulates the output voltage $V_{out}$ to a target voltage, or setpoint, by adjusting the duty cycle D of the outputs of differential amplifiers 270 and 280, and therefore adjusts the duty cycle of the transistors $Q_1$ 215 and $Q_2$ 220. The duty is the percentage (of each gate driver signal cycle) in which the gate driver signal is high, which turns on the associated transistor. Thus, the duty cycle $D=T_{on}/T_s$, where $T_{on}$ is the on-time (which is the length of time in a given cycle that the gate driver signal is high), and where $T_s$ is the length of one signal cycle. When the output voltage $V_{out}$ is not equal to the reference voltage $V_{ref}$, the compensator 265 adjusts the compensation signal, such that the effective on-times of $Q_1$ and $Q_2$ are adjusted to bring $V_{out}$ back into regulation ($V_{out}=V_{ref}$). For example, a load current step increase is one event that can, for a short time, cause $V_{out}$ to differ from $V_{ref}$. During such an event, almost immediately the output capacitor 250 would begin to discharge, so the output voltage $V_{out}$ would drop. The voltage would again rise and reach steady state after the feedback loop has reacted to the difference in $V_{ref}$ vs. $V_{out}$ by adjusting the on-time $T_{on}$ of $Q_1$ and $Q_2$.

One challenge with this approach, specifically for current doubler secondary rectifiers, is that the leakage inductance of the transformer 235 limits the ability of the converter 200 to react to load step increases. Due to the operation of the current doubler, the duty cycle for transistor $Q_1$ 215 and transistor $Q_2$ 220 is limited to 50%. Furthermore, because the $Q_1$ and $Q_2$ gate driver waveforms are phase shifted by 180 degrees, when the output voltage $V_{out}$ is less than the reference voltage $V_{ref}$, the control loop can only increase the duty cycle to a maximum of 50%. Upon reaching 50% duty cycle, transistor $Q_1$ 215 and transistor $Q_2$ 220 alternate being on for the time $T_{on}$, which is equal to $T_s/2$ for a fixed frequency control loop. When transistor $Q_1$ 215 turns off and transistor $Q_2$ 220 turns on, the leakage inductance of the transformer 235 has to charge/discharge. This charge/discharge event can significantly limit the transient performance of the converter 200, which is its ability to quickly bring the output voltage $V_{out}$ back into regulation.

Figure 3:
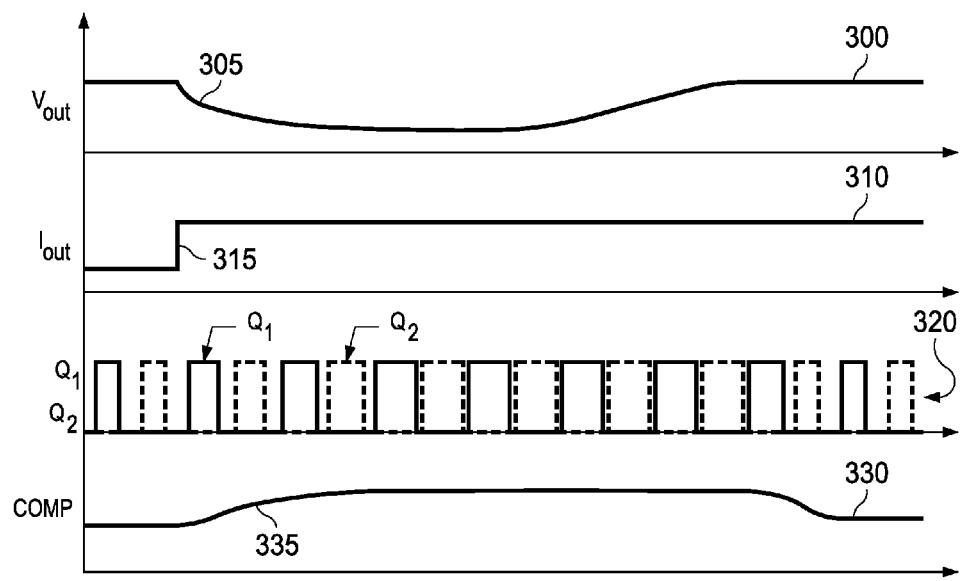
FIG. 3 shows two graphs plotting the output voltage of a voltage conversion device, the compensation signal generated by a compensator, and the output current of the voltage converter during a transient increase in load current.

FIG. 3 is a graph plotting the output voltage $V_{out}$ 300 of the voltage converter, the load current $I_{out}$ 310, the alternating transistor gate driver signals $Q_1$ and $Q_2$ 320, and the compensation signal 330 generated by the compensator 265 during a transient increase in load current. FIG. 3 demonstrates the aforementioned challenges that an isolated voltage converter, such as voltage converter 200 of FIG. 2, can have in responding to transient increases in load current. FIG. 3 shows a sudden drop (shown generally at 305) in $V_{out}$, which is caused by a corresponding sudden increase 315 in load current $I_{out}$. The load current $I_{out}$ is the sum of the current $I_{L1}$ through inductor $L_1$ 285 and the current $I_{L2}$ through inductor $L_2$ 290, minus the current through the output capacitor 250. At the instant of the load current increase 315, $I_{L1}+I_{L2}$ is less than the load current $I_{out}$, so the output capacitor 250 gets discharged. The compensation signal 330 is generated by filtering the error signal, which in turn is generated by subtracting the output voltage $V_{out}$ from the reference voltage $V_{ref}$. Thus, when the output voltage $V_{out}$ drops, the compensation signal increases, as shown generally at 335. The increasing compensation signal 330 causes the on-times of the gate driver signals $Q_1$ and $Q_2$ to increase, in order to raise the output voltage $V_{out}$, and in order to bring it back into line with the reference voltage $V_{ref}$. The duty cycles of each of $Q_1$ and $Q_2$ are limited to 50%, and the frequency remains constant. The increased on-times (increased duty cycle) of $Q_1$ and $Q_2$ remain in effect until the output voltage $V_{out}$ comes back into regulation, at which point the duty cycles of $Q_1$ and $Q_2$ decrease back to near the previous steady state value. As mentioned previously, when transistor $Q_1$ 215 turns off and transistor $Q_2$ 220 turns on, the leakage inductance of the transformer 235 has to charge/discharge. This charge/discharge event can significantly limit the transient performance of the converter 200, thereby increasing the amount of time for bringing the output voltage $V_{out}$ back into regulation.

Figure 4:
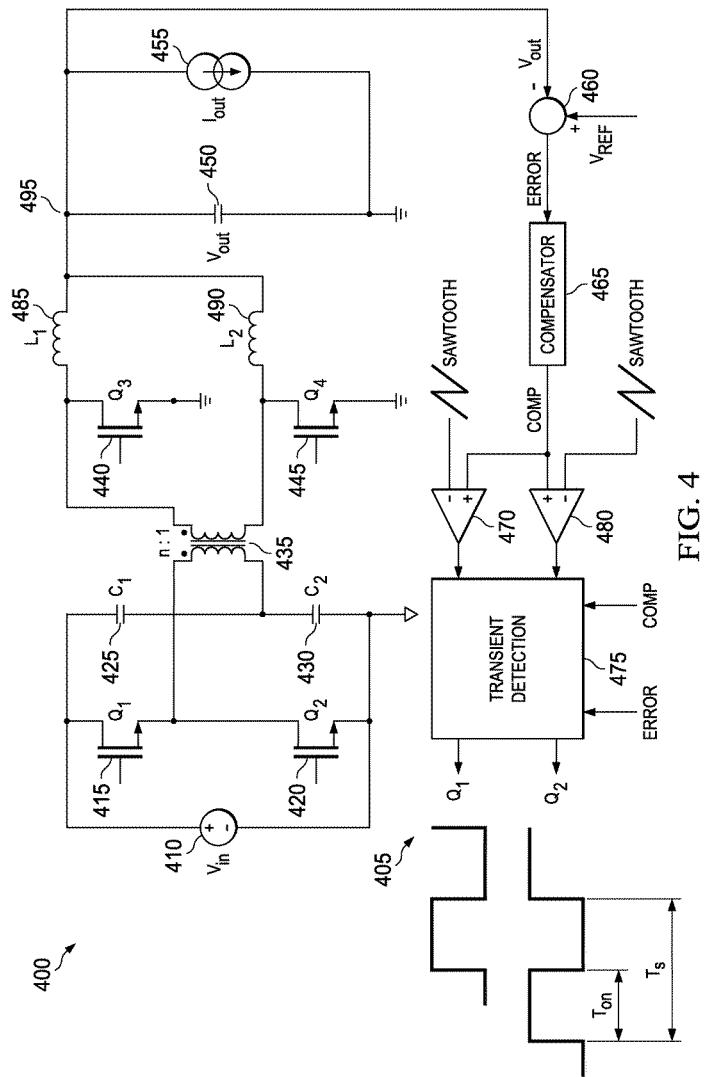
FIG. 4 is an example circuit diagram of an isolated voltage converter and associated control circuitry with improved transient response.

FIG. 4 is an example circuit diagram of an isolated voltage converter 400 and associated control circuitry 405 with improved transient response. The described examples are applicable to many different voltage converter topologies and control loop implementations. The structure of the voltage converter 400 (FIG. 4) is the same as the structure of the voltage converter 200 (FIG. 2). Thus, the voltage converter 400 receives an input voltage $V_{in}$ 410. The voltage converter 400 employs a transformer 435 having a primary side and a secondary side. The primary side is coupled to two transistors, $Q_1$ 415 and $Q_2$ 420, which are connected in series across the input voltage $V_{in}$ 410. The input voltage $V_{in}$ is coupled across the drain of transistor $Q_1$ 415 and the source of $Q_2$ 420. The source of $Q_1$ 415 is coupled to the drain of $Q_2$ 420, and this node is coupled to a first end of the primary side of the transformer 435. The input voltage $V_{in}$ 410 is also coupled across two capacitors, $C_1$ 425 and $C_2$ 430, which are connected in series. The junction of $C_1$ 425 and $C_2$ 430 is coupled to the second end of the primary side of the transformer 435.

The secondary side of the transformer 435 is coupled to a current doubler circuit, which includes two transistors $Q_3$ 440 and $Q_4$ 445 and two inductors $L_1$ 485 and $L_2$ 490. As shown in FIG. 4, a first end of the secondary side of the transformer 435 is coupled to the drain of transistor $Q_3$ 440, and the second end of the secondary side of the transformer is coupled to the drain of $Q_4$ 445. The sources of transistors $Q_3$ 435 and $Q_4$ 440 are both coupled to ground. The first end of the secondary side of the transformer 435 is coupled to a first end of inductor $L_1$ 485, and the second end of the secondary side of the transformer is coupled to inductor $L_2$ 490. The second ends of the inductors $L_1$ 485 and $L_2$ 490 are coupled together at a node 495, which constitutes the output of the voltage converter 400. The output voltage $V_{out}$ is coupled to a load 455, and to an output capacitor 450 coupled in parallel with the load 455.

The control loop 405 of FIG. 4 is similar to the control loop 205 of FIG. 2, but also includes a transient detection block 475 that addresses the problem of leakage inductance limiting the transient performance of the converter. The control loop and system behavior of FIG. 4 are the same as FIG. 2 during steady state conditions. But in FIG. 4, during a transient increase in load current, the control loop will recognize the transient condition (by looking at either the error signal or compensation signal, or both). Upon detection that the system is not in steady state, the control loop decreases the frequency of the gate driver signals driving transistors $Q_1$ 415 and $Q_2$ 420 by a certain amount, thereby increasing the on-time $T_{on}$ of $Q_1$ and $Q_2$ without increasing the duty cycle.

Similar to the control bop 205 of FIG. 2, the control loop 405 of FIG. 4 receives the output voltage $V_{out}$ and compares it to a reference voltage $V_{ref}$ that represents a target output voltage, as represented by the subtraction element 460 in FIG. 4. The difference between $V_{out}$ and the reference voltage $V_{ref}$, also referred to herein as the error or $V_{error}$, is provided to a compensator module 465, which generates a compensation signal in response to the difference. The compensation signal is provided to the non-inverting inputs of differential amplifiers 470 and 480. The inverting input of differential amplifier 470 receives a first sawtooth signal, and the inverting input of differential amplifier 480 receives a second sawtooth signal. The output of differential amplifier 470 is a substantially square wave, and the output of differential amplifier 480 is a substantially square wave that is phase shifted 180 degrees from the output of differential amplifier 470. A transient detection block 475 receives the outputs of the differential amplifiers 470 and 480. The transient detection block 475 also detects occurrence of a transient increase in load current or load voltage. In an example embodiment, the transient detection block 475 receives and monitors the error signal (the difference between $V_{out}$ and $V_{ref}$) and/or the compensation signal generated by compensator 465 to detect when a transient condition is occurring. In one such example embodiment, the transient detection block 475 monitors the rate of change of the error signal and/or the compensation signal, and if the rate of change exceeds a predetermined threshold, determines that a transient condition exists.

If the transient detection block 475 determines that the load is in a steady state (i.e., not transient), then the transient detection block 475 outputs unmodified the signals received from the differential amplifiers 470 and 480 as gate driver signals to transistor $Q_1$ 415 and transistor $Q_2$ 420. Conversely, if the transient detection block 475 detects a transient condition, then it decreases the frequency of the gate driver signals driving transistors $Q_1$ 415 and $Q_2$ 420 by a specified amount, thereby increasing the on-time $T_{on}$ of $Q_1$ and $Q_2$ without increasing the duty cycle. For example, the transient detection block 475 could decrease the frequency of the gate driver signals to one-half (50%) of the steady-state frequency, thereby doubling the on-time $T_{on}$ of $Q_1$ and $Q_2$. Or, as another example, the frequency could be cut to two-thirds of the steady-state frequency, thereby increasing the on-time of $Q_1$ and $Q_2$ by a factor of 1.5.

Figure 5:
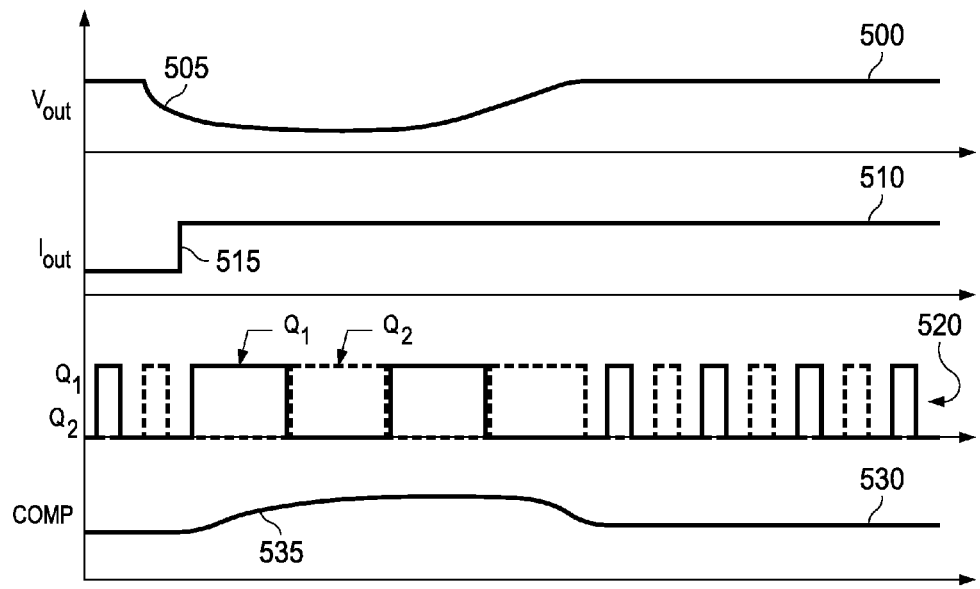
FIG. 5 shows two graphs plotting the output voltage of a voltage conversion device, the compensation signal generated by a compensator, and the output current of the voltage converter during a transient increase in load current when increasing the on-time of the gate driver signals driving the control transistors of the voltage conversion device.

Increasing the on-time during the transient event significantly reduces the negative effect of charging/discharging the leakage inductance of the transformer 435. As a specific example, if the on-time is doubled during the transient, the converter 400 will only need to charge/discharge the leakage inductance half as many times. Because the charging/discharging of the leakage inductance is what limits the converter's ability to increase load current to match the output current, increasing the on-time significantly improves the output voltage transient response. This is demonstrated in FIG. 5, which is a graph plotting the output voltage $V_{out}$ 500 of the voltage converter, the load current $I_{out}$ 510, the alternating transistor gate driver signals $Q_1$ and $Q_2$ 520, and the compensation signal 530 generated by the compensator 465 during a transient increase in load current when increasing the on-time (decreasing the frequency) of the gate driver signals driving transistors $Q_1$ 415 and $Q_2$ 420. Like FIG. 3, FIG. 5 shows a sudden drop (shown generally at 505) in $V_{out}$, which is caused by a corresponding sudden increase 515 in load current $I_{out}$. When the output voltage $V_{out}$ drops, the compensation signal increases, as shown generally at 535. The transient detection block 475 detects the transient condition, such as by monitoring the compensation signal or the error signal. When the transient detection block 475 detects the transient condition, it decreases the frequency of the transistor gate driver signals $Q_1$ and $Q_2$ while increasing their on-times (duty cycles), as shown in FIG. 5. The increased duty cycles of $Q_1$ and $Q_2$ cause the output voltage $V_{out}$ to increase, in order to bring it back into line with the reference voltage $V_{ref}$. The duty cycles of each of $Q_1$ and $Q_2$ are limited to 50% for reasons described above. The increased on-times (increased duty cycles) and decreased frequencies (longer signal periods) of $Q_1$ and $Q_2$ remain in effect until the output voltage $V_{out}$ comes back into regulation, at which point the duty cycles of $Q_1$ and $Q_2$ decrease back to near the previous steady state value, and the frequency of $Q_1$ and $Q_2$ returns (increases) to near the previous steady state frequency. As mentioned previously, when transistor $Q_1$ 215 turns off and transistor $Q_2$ 220 turns on, the leakage inductance of the transformer 235 has to charge/discharge. This charge/discharge event can significantly limit the transient performance of the converter 200, thereby increasing the amount of time for bringing the output voltage $V_{out}$ back into regulation. By increasing the on-time during the transient event, the negative effect of charging/discharging the leakage inductance of the transformer 435 is significantly reduced, thereby improving the converter's ability to increase load current to match the output current. Thus, in comparing FIG. 5 to FIG. 3 (which does not benefit from the transient detection and compensation as described with respect to FIG. 4), the transient detection and compensation technique significantly reduces the amount of time for bringing the output voltage $V_{out}$ back into regulation.

Figure 6:
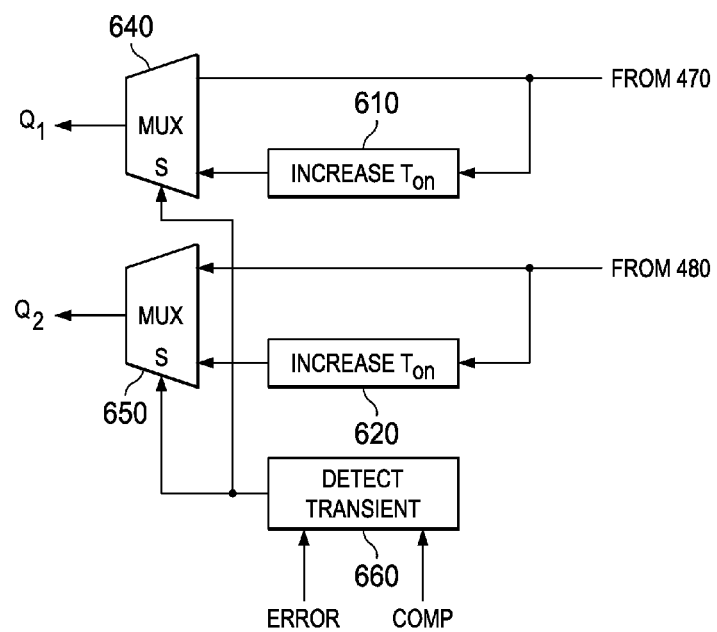
FIG. 6 is a functional block diagram of an example implementation of the transient detection block shown in FIG. 4.

The transient detection block 475 of FIG. 4 can be implemented in various ways. FIG. 6 is a functional block diagram of one possible implementation of the transient detection block 475. The waveform generated by differential amplifier 470 is applied to a first input of multiplexer 640. The waveform from differential amplifier 470 is also applied to an on-time increase block 610, which increases the on-time $T_{on}$ of the waveform by decreasing the switching frequency of the signal without changing the duty cycle. The increased on-time waveform is applied to a second input of multiplexer 640. The output of multiplexer 640 is the gate driver signal for transistor $Q_1$ 415 of FIG. 4. Similarly, the signal generated by differential amplifier 480 is applied to a first input of multiplexer 650. The signal from differential amplifier 480 is also applied to an on-time increase block 620, which increases the on-time $T_{on}$ of the signal by decreasing the switching frequency of the waveform without changing the duty cycle. The increased on-time signal is applied to a second input of multiplexer 650. The output of multiplexer 650 is the gate driver signal for transistor $Q_2$ 420 of FIG. 4.

The detect transient block 660 of FIG. 6 receives one or both of the error signal (the difference between the output voltage $V_{out}$ and the reference voltage $V_{ref}$) and the compensation signal generated by compensator 465. Based on observations of the error signal and/or the compensation signal, the detect transient block 660 determines whether a transient condition exists. In an example embodiment, the detect transient block 660 monitors the rate of change of the error signal and/or the compensation signal, and if the rate of change exceeds a predetermined threshold, declares that a transient condition exists. The detect transient block 660 provides a transient status signal to the select inputs of multiplexers 640 and 650, indicating whether a transient condition is detected. In one example: (a) if a transient is detected, the detect transient block 660 provides a high signal ("1") to the select lines of multiplexers 640 and 650; and (b) if a transient is not detected, the detect transient block 660 provides a low signal ("0") to the select lines of multiplexers 640 and 650. If the select input of multiplexer 640 is low, the multiplexer 640 outputs the waveform received directly from differential amplifier 470. Conversely, if the select input of multiplexer 640 is high, the multiplexer 640 outputs the waveform having the increased on-time. Likewise, if the select input of multiplexer 650 is low, the multiplexer 650 outputs the waveform received directly from differential amplifier 480. Conversely, if the select input of multiplexer 650 is high, the multiplexer 650 outputs the waveform having the increased on-time.

Figure 7:
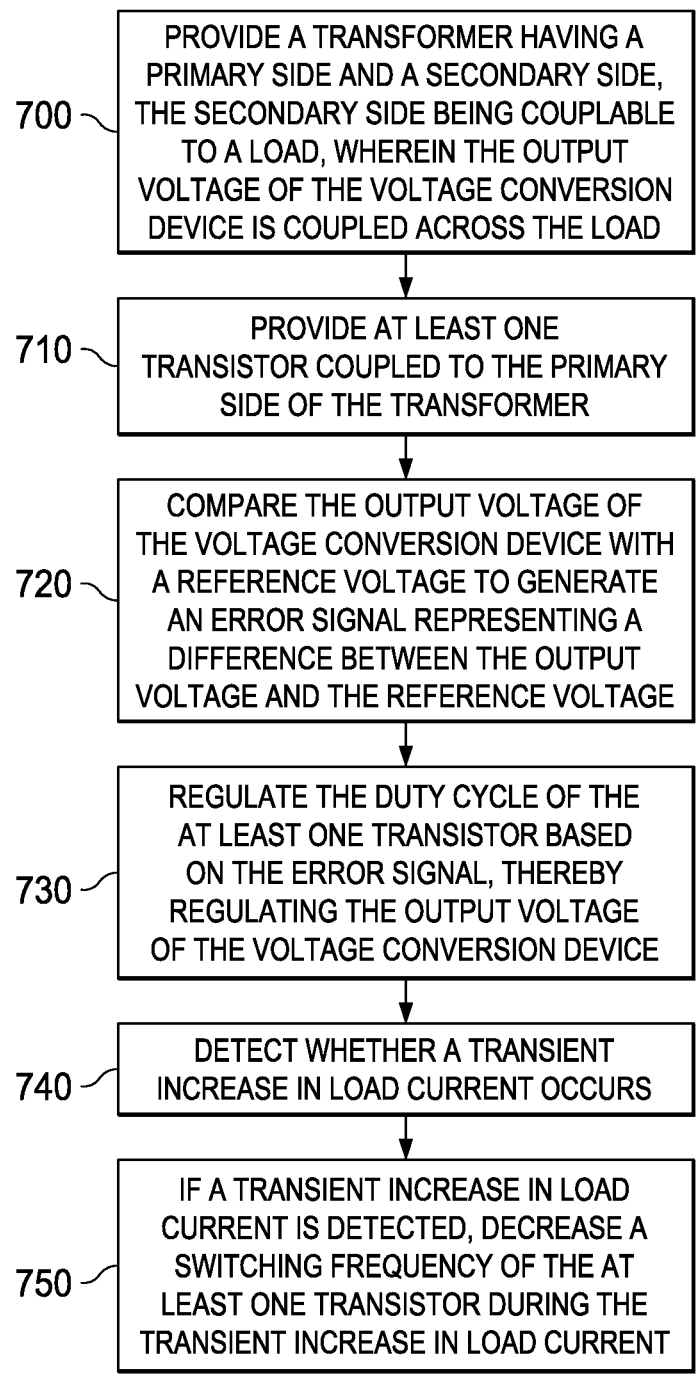
FIG. 7 is a flowchart of a method of operating a voltage conversion device.

FIG. 7 is a flowchart of a method of operating a voltage conversion device in accordance with example embodiments. At step 700, a transformer having a primary side and a secondary side is provided. The secondary side is couplable to a load, and the output voltage of the voltage conversion device is coupled across the load. At step 710, at least one transistor coupled to the primary side of the transformer is provided. At step 720, the output voltage of the voltage conversion device is compared to a reference voltage to generate an error signal representing a difference between the output voltage and the reference voltage. At step 730, the duty cycle of the at least one transistor is regulated based on the error signal. By regulating the duty cycle of the at least one transistor, the output voltage of the voltage conversion device is regulated. Step 740 detects whether a transient increase in load current occurs. At step 750, if a transient increase in load current is detected, a switching frequency of the at least one transistor is decreased during the transient increase in load current.

Accordingly, the described examples include circuits and methods for improving the transient response of an isolated voltage converter by increasing the on-time of the converter's control transistors in response to detecting a transient increase in load current. Modifications are possible in the described embodiments, and other embodiments are possible, within the scope of the claims. For example, while certain aspects of the disclosure are described with respect to a voltage converter topology employing a current doubler secondary-side configuration, such aspects can also be applied to many different voltage converter topologies.

What is claimed is:
1. A voltage conversion system comprising:
a transformer having a primary side and a secondary side, the secondary side being couplable to a load, wherein an output voltage of the voltage conversion system is couplable across the load;
at least one transistor coupled to the primary side of the transformer, to regulate the output voltage of the voltage conversion system in response to a periodic transistor driver signal that turns the transistor on and off, wherein the output voltage is a function of at least: a duty cycle of the transistor driver signal; and a switching frequency of the transistor driver signal; and
a control circuit to: receive the output voltage and compare it with a reference voltage to generate an error signal representing a difference between the output voltage and the reference voltage; and in response to the error signal, generate the transistor driver signal;
wherein the control circuit includes transient detection circuitry to: in response to the error signal, detect whether a transient increase in load current exists and whether a steady state in load current exists; in response to detecting the transient increase in load current, generate the transistor driver signal to increase an on-time of the transistor by decreasing the switching frequency without increasing the duty cycle; and, in response to detecting the steady state in load current, generate the transistor driver signal by regulating the duty cycle without changing the switching frequency.

2. The system of claim 1 wherein the control circuit is coupled to detect the transient increase in load current by monitoring the error signal.

3. The system of claim 1 wherein the decreasing of the switching frequency of the transistor driver signal decreases a number of leakage inductance charge/discharge cycles of the transformer.

4. The system of claim 1 wherein the at least one transistor includes:

a first transistor having first, second and third terminals, wherein a voltage at the first terminal controls whether current flows from the second terminal to the third terminal, wherein the second terminal is coupled to an input voltage of the voltage conversion system, the third terminal is coupled to a first end of the primary side of the transformer, and the first terminal is coupled to receive a first periodic transistor driver signal from the control circuit; and a second transistor having first, second and third terminals, wherein a voltage at the first terminal controls whether current flows from the second terminal to the third terminal, wherein the second terminal is coupled to the third terminal of the first transistor and also to the first end of the primary side of the transformer, the third terminal is coupled to ground, and the first terminal is coupled to receive a second periodic transistor driver signal from the control circuit.

5. The system of claim 4, further comprising:
a first capacitor coupled between the input voltage and a second end of the primary side of the transformer; and
a second capacitor coupled between the second end of the primary side of the transformer and ground.

6. The system of claim 1 wherein the secondary side of the transformer is coupled to a current doubler circuit whose output current is provided to the load, and wherein an output capacitor is coupled, in parallel with the load, between the output of the current doubler circuit and ground.

7. The system of claim 6 wherein the current doubler circuit includes:
a third transistor having first, second and third terminals, wherein a voltage at the first terminal controls whether current flows from the second terminal to the third terminal, wherein the second terminal is coupled to a first end of the secondary side of the transformer, the third terminal is coupled to ground, and the first terminal is coupled to receive a third transistor driver signal; and
a fourth transistor having first, second and third terminals, wherein a voltage at the first terminal controls whether current flows from the second terminal to the third terminal, wherein the second terminal is coupled to a second end of the secondary side of the transformer, the third terminal is coupled to ground, and the first terminal is coupled to receive a fourth transistor driver signal;
a first inductor coupled between the first end of the secondary side of the transformer and the load; and
a second inductor coupled between the second end of the secondary side of the transformer and the load.

8. A voltage conversion device comprising:
a transformer having a primary side and a secondary side, the secondary side being couplable to a load, wherein an output voltage of the voltage conversion device is couplable across the load;
at least one transistor coupled to the primary side of the transformer, to regulate the output voltage of the voltage conversion device, wherein the output voltage is a function of at least: a duty cycle of the transistor; and a switching frequency of the transistor; and
a control circuit to regulate the duty cycle and the switching frequency of the transistor in response to a difference between the output voltage and a reference voltage;
wherein the control circuit includes transient detection circuitry to: in response to the output voltage, detect whether a transient increase in load current exists and whether a steady state in load current exists; in response to detecting the transient increase in load current, increase an on-time of the transistor by decreasing the switching frequency without increasing the duty cycle of the transistor; and, in response to detecting the steady state in load current, regulate the duty cycle without changing the switching frequency of the transistor.

9. The device of claim 8 wherein the decreasing of the switching frequency of the transistor decreases the number of leakage inductance charge/discharge cycles of the transformer.

10. The device of claim 8 wherein the at least one transistor includes:
a first transistor having first, second and third terminals, wherein a voltage at the first terminal controls whether current flows from the second terminal to the third terminal, wherein the second terminal is coupled to an input voltage of the voltage conversion device, the third terminal is coupled to a first end of the primary side of the transformer, and the first terminal is coupled to receive a first transistor driver signal; and
a second transistor having first, second and third terminals, wherein a voltage at the first terminal controls whether current flows from the second terminal to the third terminal, wherein the second terminal is coupled to the third terminal of the first transistor and also to the first end of the primary side of the transformer, the third terminal is coupled to ground, and the first terminal is coupled to receive a second transistor driver signal.

11. The device of claim 10, further comprising:
a first capacitor coupled between the input voltage and a second end of the primary side of the transformer; and
a second capacitor coupled between the second end of the primary side of the transformer and ground.

12. The device of claim 8 wherein the secondary side of the transformer is coupled to a current doubler circuit whose output current is provided to the load, and wherein an output capacitor is coupled, in parallel with the load, between the output of the current doubler circuit and ground.

13. The device of claim 12 wherein the current doubler circuit includes:
a third transistor having first, second and third terminals, wherein a voltage at the first terminal controls whether current flows from the second terminal to the third terminal, wherein the second terminal is coupled to a first end of the secondary side of the transformer, the third terminal is coupled to ground, and the first terminal is coupled to receive a third transistor driver signal; and
a fourth transistor having first, second and third terminals, wherein a voltage at the first terminal controls whether current flows from the second terminal to the third terminal, wherein the second terminal is coupled to a second end of the secondary side of the transformer, the third terminal is coupled to ground, and the first terminal is coupled to receive a fourth transistor driver signal;
a first inductor coupled between the first end of the secondary side of the transformer and the load; and
a second inductor coupled between the second end of the secondary side of the transformer and the load.

14. A method of operating a voltage conversion device that includes a transformer having a primary side and a secondary side, the secondary side being couplable to a load, wherein an output voltage of the voltage conversion device is couplable across the load, the method comprising:

comparing the output voltage of the voltage conversion device with a reference voltage to generate an error signal representing a difference between the output voltage and the reference voltage; and in response to the error signal, generating a transistor driver signal to regulate at least one transistor coupled to the primary side of the transformer, wherein the output voltage of the voltage conversion device is a function of at least: a duty cycle of the transistor driver signal; and a switching frequency of the transistor driver signal;

wherein generating the transistor driver signal includes: in response to the error signal, detecting whether a transient increase in load current exists and whether a steady state in load current exists; in response to detecting the transient increase in load current, generating the transistor driver signal to increase an on-time of the transistor by decreasing the switching frequency without increasing the duty cycle; and, in response to detecting the steady state in load current, generating the transistor driver signal by regulating the duty cycle without changing the switching frequency.

15. The method of claim 14 wherein detecting whether the transient increase in load current exists includes:
   maintaining a threshold value for a rate of increase of the error signal;
   determining a rate of increase of the error signal; and
   detecting the transient increase in load current, in response to the rate of increase of the error signal exceeding the threshold value.

16. The method of claim 14 wherein the decreasing of the switching frequency of the transistor driver signal decreases a number of leakage inductance charge/discharge cycles of the transformer.

* * * * *